US006435553B1

(12) United States Patent
Wipasuramonton et al.

(10) Patent No.: US 6,435,553 B1
(45) Date of Patent: Aug. 20, 2002

(54) AIR BAG AND METHOD OF SEAM ASSEMBLY FOR MINIMIZING GAS LEAKAGE

(75) Inventors: Pongdet P. Wipasuramonton, Rochester; Robert Tobian, New Baltimore, both of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/528,967

(22) Filed: Mar. 20, 2000

(51) Int. Cl.[7] .............................................. B60R 21/16
(52) U.S. Cl. .................................................. 280/743.1
(58) Field of Search ............................ 280/728.1, 729, 280/742, 743.1, 743.2; 112/418; 428/102, 103, 104, 192, 193

(56) References Cited

U.S. PATENT DOCUMENTS

| 2,576,324 A | * 11/1951 | Wirt ............................ 112/419 |
| 2,624,886 A | 1/1953 | Herman |
| 3,762,351 A | * 10/1973 | Jager ...................... 112/475.08 |
| 3,807,754 A | 4/1974 | Rodenbach et al. |
| 3,879,057 A | 4/1975 | Takayoshi et al. |
| 4,530,868 A | 7/1985 | Shinmi et al. |
| 4,593,418 A | 6/1986 | Simon |
| 5,114,180 A | * 5/1992 | Kami et al. ............... 280/743.1 |
| 5,193,847 A | 3/1993 | Nakayama |
| 5,782,489 A | 7/1998 | LaLonde et al. |
| 5,909,895 A | * 6/1999 | Iino et al. ................ 280/743.1 |
| 5,945,185 A | 8/1999 | Hirai et al. |
| 6,113,141 A | * 9/2000 | Baker ...................... 280/743.2 |
| 6,129,377 A | 10/2000 | Okumura et al. |
| 6,220,629 B1 | 4/2001 | Wipasuramonton et al. |

FOREIGN PATENT DOCUMENTS

| DE | 25 52 815 | 5/1977 |
| JP | 410129380 A | 5/1998 |
| JP | 410166978 A | 6/1998 |

* cited by examiner

Primary Examiner—Paul N. Dickson
Assistant Examiner—David R. Dunn
(74) Attorney, Agent, or Firm—Markell Seitzman (57) ABSTRACT

A safety apparatus including an air bag (20). The air bag includes a first (22) and second (24) panel of flexible, impermeable material, each panel having a respective peripheral edge (23,25). The first and second panels are joined together along a structural first joint (110), which extends along a substantial portion of the peripheral edges to define an inflatable chamber (26) therebetween. The first joint (110) is subject to a peel load as the first and second panels are urged apart as the chamber is inflated. The apparatus also includes inlet means (32, 44) for communicating inflation gas into the chamber. A pressure barrier (100) is located within the chamber, for preventing inflation gas from bearing against the first joint. In the preferred embodiment, the pressure barrier is not subject to the peel load as is the first joint.

15 Claims, 7 Drawing Sheets

AIR BAG AND METHOD OF SEAM ASSEMBLY FOR MINIMIZING GAS LEAKAGE

BACKGROUND AND SUMMARY OF THE INVENTION

The invention generally relates to air bags and more particularly to air bags having a novel seam construction. While the present invention is applicable to many types of air bags, it will find favor with air bags that are designed to stay inflated for extended periods of time. For example, an air bag used to provide occupant protection during a rollover accident is one type of bag designed to stay inflated for a relatively long period. Generally, a rollover type of air bag would also include most if not all side impact air bags including seat mounted, vehicle frame-mounted or door-mounted, or side curtain air bags.

Historically, air bags have been made by sewing facing or adjacent panels of material together along a seam. The seam may include one or more rows of thread. To keep gas pressure in an air bag for longer durations, the panels can be made from low permeability woven fabric or made using woven fabric that is appropriately coated, typically by silicone or urethane. Depending on its application, the coating layer can be on the inside or the outside of the air bag. A portion of the prior art seam 21 is diagrammatically shown in FIG. 1. However, in the context of a long duration air bag, this type of seam has its deficiencies.

Figure 1:
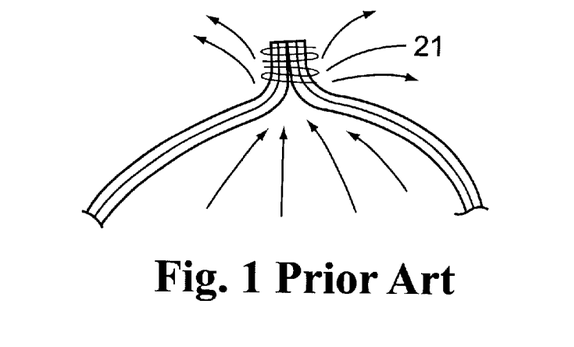
FIG. 1 shows a prior art, seam construction.

Any seam, including seam 21, must be sufficiently robust and stay together while the air bag is inflated. A sewn seam has proven to be both a cost-effective way of joining mating panels together and one that provides the required strength. However, the process of sewing creates many hundreds of needle/thread holes in the panels. Even though each needle/thread hole is very small, they collectively present a relatively large flow area through which inflation gas can escape from the air bag and in between fabric panels. FIG. 1 diagrammatically illustrates inflation gas escaping through the needle/thread holes. Additionally, as the air bag panels are pulled apart at the seam during inflation, the size of these needle/thread holes will increase, increasing the amount of pressure lose.

The prior art shows techniques that try to avoid the problems related to needle/thread holes. For example, the prior art has recognized that the needle/thread holes can be sealed after the panels are sewn together. However, this post-sewing, sealing step is undesirable because the sealing material is typically sticky (at least just after it is applied) and creates many manufacturing and handling related problems. Furthermore, it does not effectively seal the stretching of needle holes due to pressure. These deficiencies in the prior art are obviated by the present invention.

Further, the prior art shows using knitted or woven bags, which eliminate or at least minimize the number and length of sewn seams in the bag. This type of construction, however, requires a significant financial investment in complicated weaving or knitting equipment and still requires the air bag to be coated after it is formed and often does not totally eliminate the need for some type of sewn seam. The prior art has also suggested using microwave or radio frequency energy to weld polyurethane or urethane-coated material and/or panels together. As can be appreciated, these processes also require special equipment and elaborate manufacturing steps, outside of conventional air bag manufacturing processes, each of which significantly add to the cost of and the time to produce an air bag. The welded seam or seal by itself is not strong in tension (a pealing load) and as such this type of seam (or seal) can be more easily pulled apart than can a sewn seam.

It is an object of the present invention to provide a long-duration-pressure-sustaining air bag.

A further object of the present invention is to provide such an air bag that is constructed with machinery no more complicated than a sewing machine or at most a sewing machine in combination with RF welding equipment. The RF weld will provide a sealing mechanism only, not a structural seam.

It is a further object of the invention to form a pressure barrier upstream of a sewn seam, the pressure barrier shielding the structural sewn seam from the pressurized inflation gas within the air bag.

Accordingly the invention comprises: a safety apparatus including an air bag. The apparatus may also include an inflator, housing and/or manifold. The air bag comprises a first and second panel of flexible, material of relatively low permeability, wherein each panel has a respective, mating peripheral edge. In the preferred embodiment the panels are about the same size, but this is not a requirement of the invention. The first and second panels are joined together at least generally along or parallel to the peripheral edges of the panels to define an inflatable chamber therebetween. The structural seam or joint may extend about the entire air bag or only about a portion of the periphery of the air bag. The structural first seam is subject to a peel load or thread tension load as the first and second panels are urged or pulled apart as the air bag is inflated. The air bag also includes inlet means to receive an inflator or at least some source of inflation gas. The inlet means may also include a passage through which inflation gas is communicated into the air bag from a remotely positioned inflator. The air bag also includes a pressure barrier. The pressure barrier is located on the inside of the air bag upstream of the sewn, structural first seam or joint. The pressure barrier comprises a thin and narrow strip of material that is preferably sewn or bonded to the respective panels on each side of the sewn peripheral first seam. To lessen the degree of pressure loss in the bag, the pressure barrier would extend along the entire length of the structural seam, however this is not a requirement. The pressure barrier preferably extends along all or a defined portion of the structural or first seam. As the air bag is inflated, the panels are pulled apart at the structural seam; the pressure barrier is pushed into the structural or first seam and isolates the seam from the pressurized inflation gas in the air bag, thereby reducing the migration of the inflation gas through the sewn seam and its related needle/thread holes (see FIG. 10). In one preferred embodiment the pressure barrier means is not subject to the peel load as is the first seam, while in another embodiment the edges of the pressure barrier are exposed to such a load.

Many other objects and purposes of the invention will be clear from the following detailed description of the drawings.

DETAILED DESCRIPTION OF THE DRAWINGS

Figure 2:
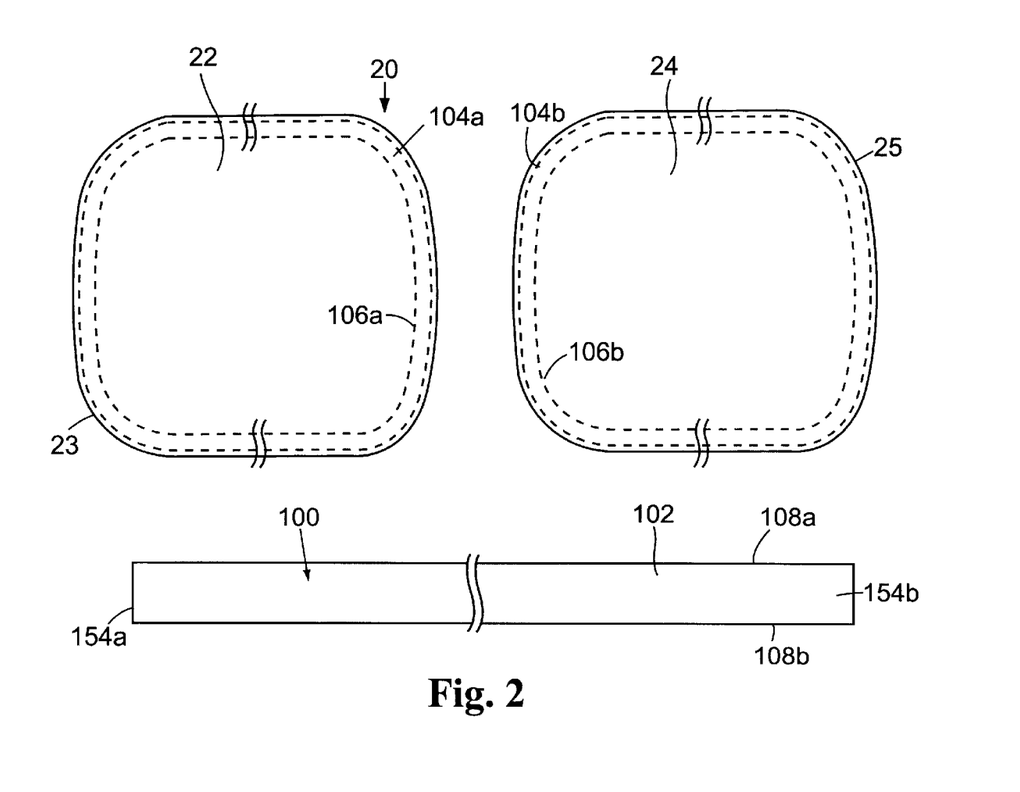
FIG. 2 shows the three major components of an air bag incorporating the present invention.

Reference is made to FIGS. 2–6, which show the various views of an air bag 20 that incorporates the present invention. FIG. 2 is a plan view of a first panel 22 and a second panel 24. Each panel is preferably made from a woven nylon fabric coated with, for example, silicone or urethane or alternatively made of a low permeability, uncoated fabric. Numerals 22a and 22b identify the respective coated and uncoated sides or layers of panel 22 and numerals 24a and 24b show the uncoated and coated sides or layers of panel 24. The air bag 20 additionally includes the pressure barrier 100, which is formed by an elongated rectangular strip or panel 102 of woven, coated material or low permeable, uncoated material. Numeral 102a and 102b illustrate the coated and uncoated sides or layers of the strip or panel 102. In FIG. 2 the panels 22, 24 and 102 are laid flat for the purpose of illustration. The panels 22 and 24 can have any shape including an irregular, circular, rectangular or oval. FIG. 2 shows dotted lines 104a and 104b, one in each of the panels 22 and 24. Each dotted line shows the location of a structural sewn seam 110 that will secure the panels together. Located within lines 104a and 104b are lines 106a and 106b. These lines respectively show the location of another sew line along which a first side 108a and a second side 108b of the strip 102 are secured to each of the panels 22 and 24.

Figure 3:
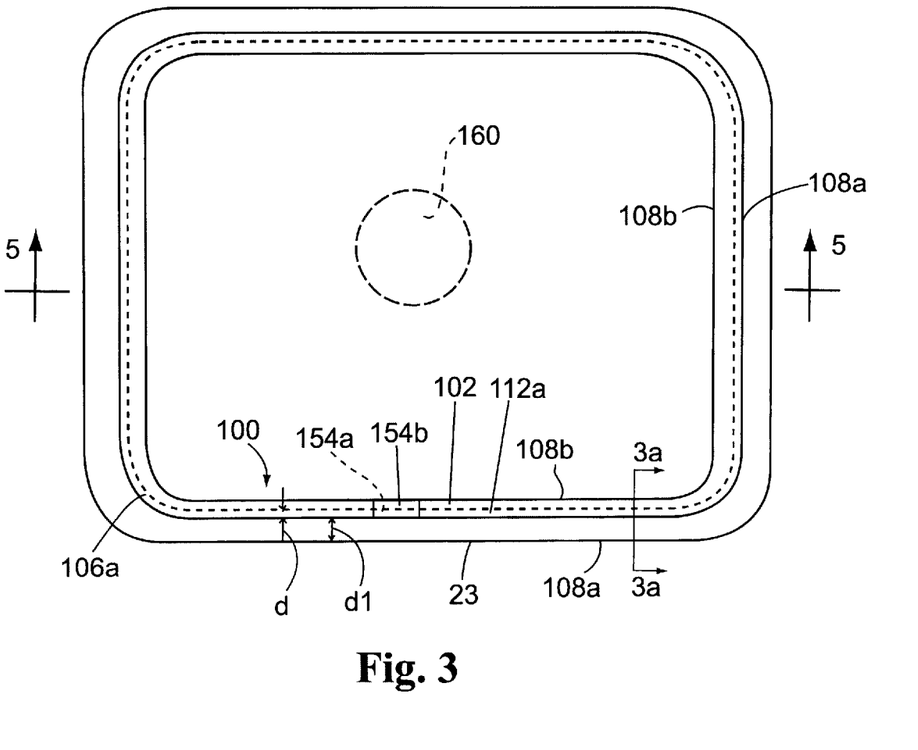
FIG. 3 is a plan view of an air bag.
Figure 3A:
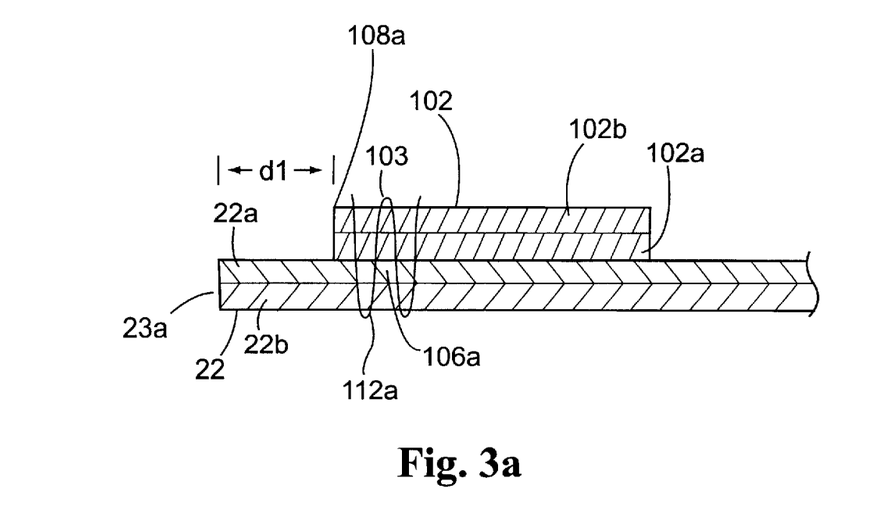
FIG. 3a is a partial cross-sectional view through section lines 3a—3a of FIG. 3 showing a construction of a first pressure barrier to a main panel.

Reference is made to FIGS. 3 and 3a. One end 154a of the material strip or panel 102 is placed upon one of the panels such as 22 with the coated layers 22a and 102a of each of the panels facing each other. Edge or side 108a of strip 102 is manipulated to lie a distance d1 (about 15 to 30 mm) from the edge 23a of panel 22, with a first end 154 at a determinable point on the panel 22. For each placement of the strip, each panel can be marked or pre-printed with a line showing the preferred location of the edge of the strip 102. The strip 102 is sewn to panel 22 at the location of line 106a (see FIG. 2). The thread or threads 103 form a sewn seam 112a, which follows the desired line 106a. The seam 112a (and 112b mentioned below) will be about 5 to 20 mm from the edge of the panel 22. The strip 102 could be marked with two such lines along each edge. For example, the panel 102 could be aligned to the marked line on the panel 22 (or 24) and then sewn to the panel 22 along the marked line on the panel 102. One or more rows of threads can be used to form seam 112a. The panel 22 is arranged on the sewing machine such that the bobbin thread is on the uncoated layer 22b portion of panel 22. Upon sewing the strip 102 to the panel 22, the resulting configuration is that as shown in FIG. 3 in which the panel 102 extends generally about or parallel to the periphery of panel 22. The ends of the strip 102 generally shown by numerals 154a,b can be overlaid to form a lap seam and sewn together to prevent leakage thereacross or alternatively left open to provide a convenient opening through which an inflator can be inserted within the air bag 20.

Figure 4:
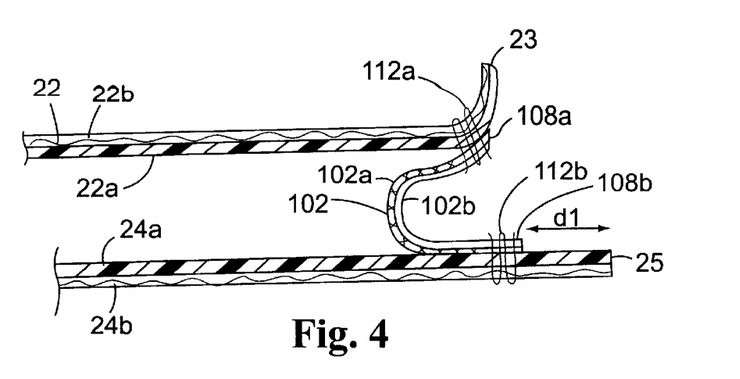
FIG. 4 is a partial sectional view showing two panels positioned on each other.

FIG. 3a is a cross-sectional view through section lines 3a—3a of FIG. 3 showing the strip 102 generally laid flat and sewn upon the panel 22. As can be seen in FIG. 3, the panel 22 includes corners. Depending upon the radius of a particular corner or the radius of the bag if it is generally circular, it might be necessary to gather or fold, as known in the art, some of the material panel 102 proximate these corners to affect the sewing of the panel 102 to the panel 22. If, however, the radius is relatively large, it will not be necessary to gather or fold portions of the panel 102 as the strip or panel 102 is sewn around the appropriate corners. As mentioned above, the shape of the panels can be symmetrical or asymmetrical, circular, oval, rectangular or otherwise. After side 108a of panel 102 is secured to panel 22, the panel 22 is turned upside-down and laid upon and registered or aligned relative to panel 24 (see FIG. 4). The panel 102 is folded over into a U-shaped configuration, as also shown in FIG. 4, with the coated side 102a of panel 102 placed on the coated side or layer 24a of panel 24. The coated layer 24a of panel 24 faces upwardly toward the coated layer of the panel 22. Side 108b of the strip 102 is then sewn at seam 112b about line 106b generally about the periphery of the panel 24 in the same manner as described above. The side 108b of panel 102 is also located a determinable distance such as d1 from the edge 25a of panel 24. As strip 102 is sewn to panel 24, that portion of panel 22 previously sewn to the strip 102 is manipulated so that it is positioned away from the sewing needle (not shown) and the panel 102 is thereafter sewn to panel 24 along the desired sew line 106b. In FIG. 4, the edge 23 of panel 22 is elevated from panel 24 as would happen during the above sewing step. The panels 22 and 24 are shown spaced from one another in FIG. 4 for the purpose of illustration. The panels would lie on each other as the strip 102 is sewn to panel 24.

Figure 5:
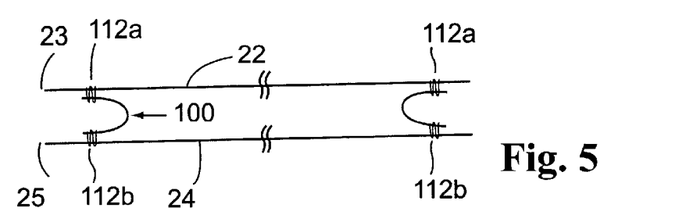
FIG. 5 is a cross-sectional view through section 5—5 of FIG. 3.
Figure 6:
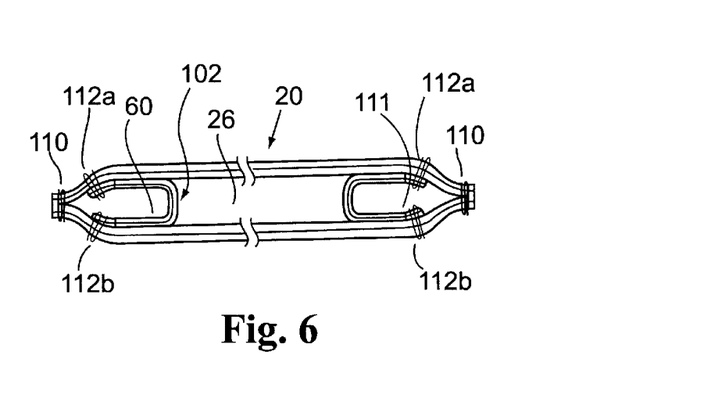
FIG. 6 is a cross-sectional view of the air bag with the edges secured with a structural seam.

Reference is briefly made to FIG. 5, which is a diagrammatic cross-sectional view through Section 5—5 of FIG. 3, and illustrates the panels 22 and 24 and the orientation of the pressure barrier 100 formed therebetween. As should be appreciated, the panels 22 and 24 are purposefully shown spaced apart for ease of illustration in FIG. 5, which also exaggerates the spacing between the edges 23 and 25 of panels 22 and 24. In the next step, the edges 23 and 25 are laid flat on one another and the panels 22 and 24 are sewn together along a structure seam 110 (see FIG. 6) which is located on lines 104a and 104b (shown in FIG. 2). The formation of seam 110 closes the air bag, forming an inflatable chamber 26 therebetween.

Figure 7:
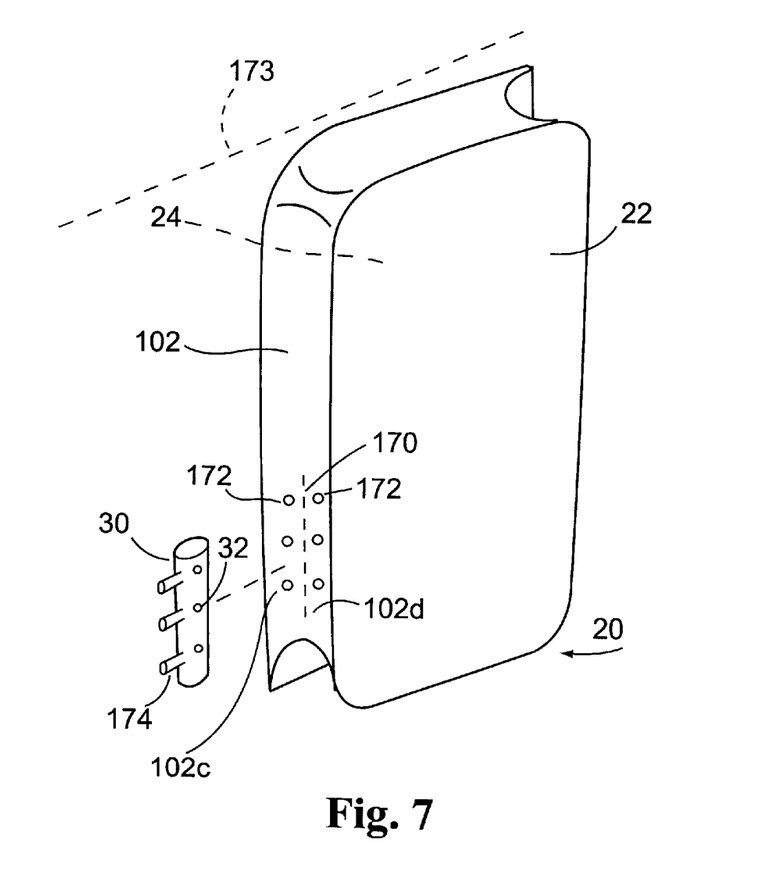
FIG. 7 shows the present invention configured as a seat mounted side impact air bag.

Inflation gas can be received within the air bag in any number of ways. For example, if the air bag 20 is to function as a driver side air bag, a gas inlet such as an opening 160, shown in dotted line in FIG. 3, can be placed in the center of one of the panels such as 22. As known in the art, a cylindrically shaped driver side inflator can be secured to panel 22 in a known manner. Alternatively, as shown in FIG. 7, a cylindrically shaped inflator 30, with one or more gas exit ports 32, can be placed within the air bag 20 through a slit 170 provided in panel 102 or in the other panels 22 or 24 and secured therein to minimize gas leakage therethrough. For example, the panel 102 may include a number of mounting openings 172 located on either side of the slit 170. Additionally the inflator 30 or a housing or manifold into which the inflator is secured in a known manner, may include a like plurality of mounting studs 174. The studs 174 are first placed through one set of openings 172 in part 102c of panel 102 and then that portion 102d of the panel 102 having the other set of openings 172 is overlapped on portion 102c and secured by fasteners, such as a threaded nut. While the orientation of bag 20 is shown vertical in FIG. 7, it can be at any required angle as dictated by its location in the vehicle or seat. As can be appreciated, the configuration of FIG. 7 would be applicable to a side impact air bag located within a vehicle seat (not shown). Panel 22, on inflation, would be located facing the occupant (driver) to be protected and panel 24 facing the side 173 (shown in phantom line) of the vehicle. Further, the bag can include a snorkel or fill tube so that the inflator can be located outside of the air bag.

Figure 8:
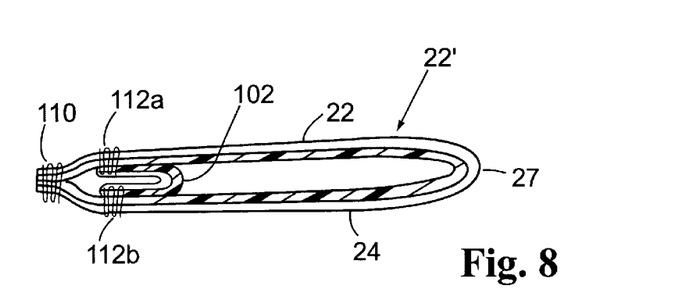
FIG. 8 shows an alternate embodiment of the invention.

As can be appreciated, the air bag 20 and more particularly the panels 22 and 24 could have been formed utilizing a larger single panel or piece of material 22', as shown in FIG. 8, rather than the two separate pieces of material as in the above figures. In this embodiment, the single piece of material is folded over a centerline 27 and the panels 22 and 24 are formed as facing portions of the folded-over larger panel. As can be appreciated, this construction eliminates one length of a previously sewn seam (along the fold or centerline 27) and need for a pressure barrier. The edges of the panels 22 and 24 are secured using the above technique with a pressure barrier inserted therebetween.

Figure 9:
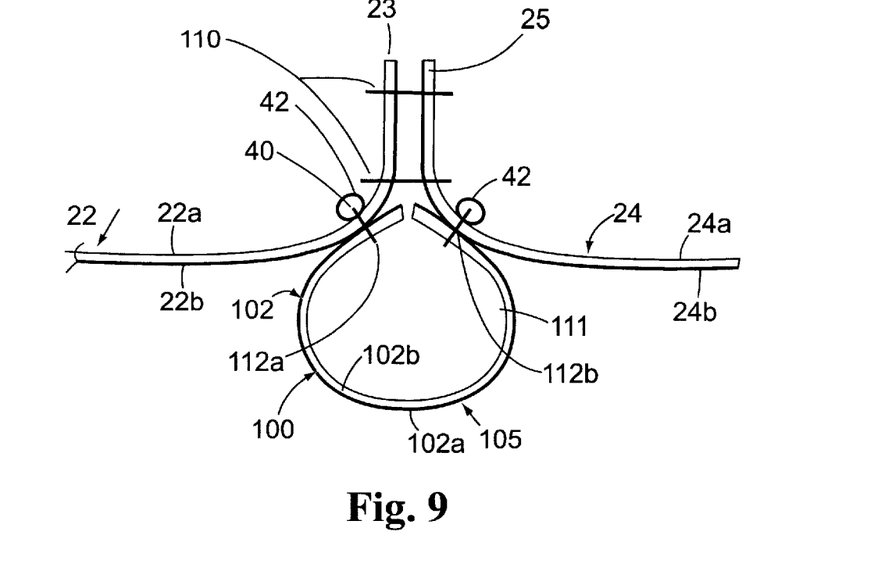
FIGS. 9 and 10 are partial cross-sectional views primarily showing a pressure barrier.

FIG. 9 is an enlarged view of one section of the pressure barrier 100 and shows in greater detail the construction and location of the seam 110 (shown as a double row of stitches), and seams 112a and 112b. This figure shows the configuration of the pressure barrier before the air bag is pressurized. The bobbin thread of the sewing machine is arranged on the ambient or exterior side of the air bag 20. In this manner, the bobbin thread and looped sewing threads, forming seams 112a and 112b, assist in closing any of the needle holes formed during sewing. Diagrammatically, the bobbin thread is shown by numeral 40 and the loop formed by the sewing threads is shown by numeral 42. For convenience the coated layers of the panels are shown as a darkened line.

From FIG. 9 it can be seen that the distance from seam 112a to seam 110 plus the distance from seam 110 to seam 112b is shorter than the distance measured along the looped portion or unsecured portion 105 of the pressure barrier 100 (panel 102). When the air bag is pressurized and the panels 22 and 24 are pulled apart, the peel loading is at seam 110. This construction does not subject the seams 112a and 112b of panel 102 to a peeling load during inflation.

Figure 10:
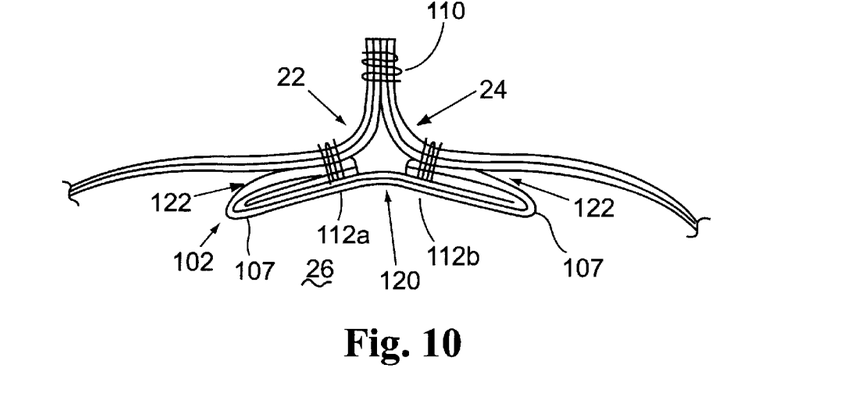

As can be appreciated, the pressure within the inside looped portion 105 will initially be at a pressure less than that of the inflating chamber 26. Further, as the air bag is pressurized, the center of the looped portion 105 of panel 102 will be pushed outwardly (see FIG. 10), that is, toward and into the center of the joint or seam 110 and the adjacent portions of panels 22 and 24. As the center of the panel 102 is deformed, as shown in FIG. 10, the now bent-over portions 107 of the panel 102 extend outwardly beyond the locations of the seams or joints 112a and 112b. These extending portions are pressed against adjacent, facing coated portions of the panel 102 to generate a seal or barrier preventing inflation gases from migrating from the seams or joints 112a and 112b in the direction of arrow 122. The coated surfaces of silicone or urethane are smoother and softer than that of the woven fabric, which has small peaks and valleys. The pushing together of these softer, smoother surfaces reduces or significantly prevents the migration of gases from the chamber 26 through to the joint or seam 110.

FIGS. 11–16 show another embodiment of the invention. In this embodiment the sides 108a and 108b of the pressure barrier extend outwardly to the edges 23 and 25 of the panels 22 and 24. Additionally, the sewn seams 112a and 112b are replaced with RF welded joints (or seams) for sealing purposes only.

Figure 11:
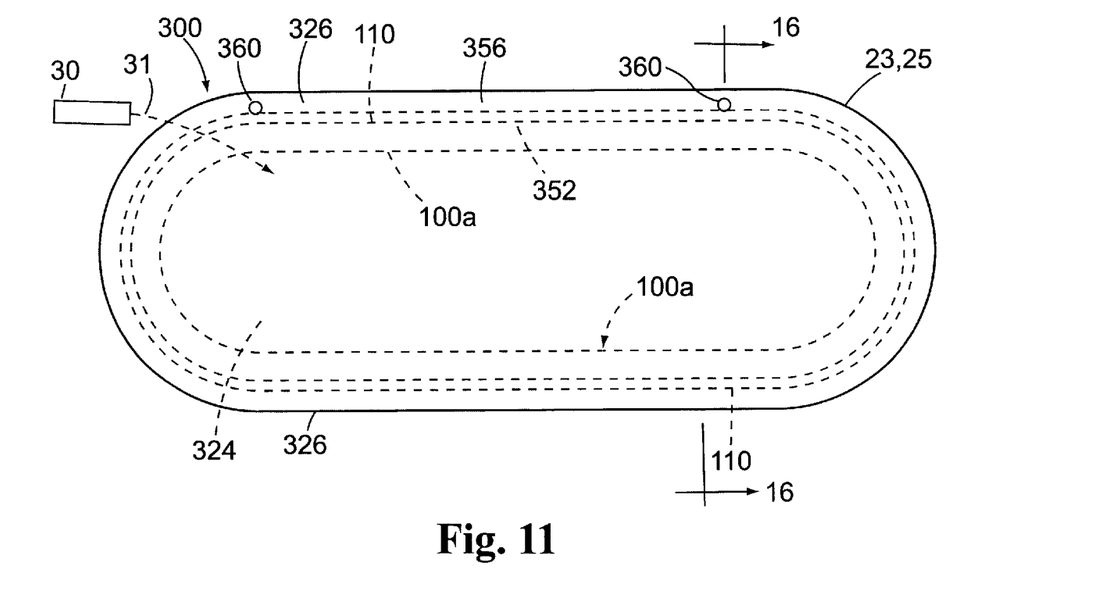
FIGS. 11–16 show another alternate embodiment of the invention.
Figure 12:
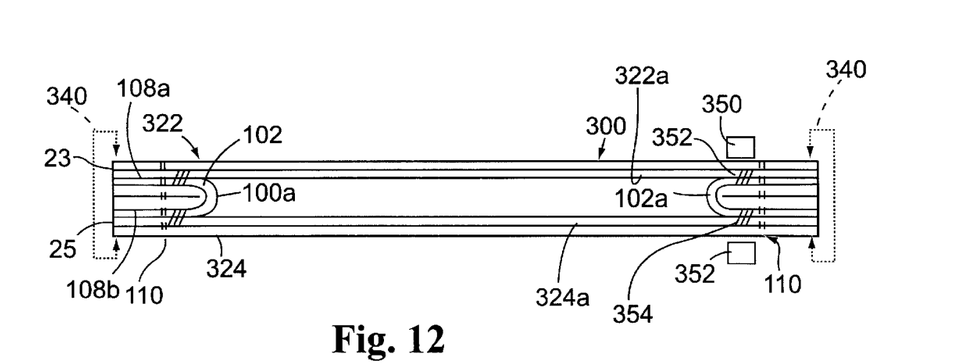

Reference is made to FIGS. 11 and 12, which show an alternate air bag 300 using a differently constructed pressure barrier 100a. The air bag 300 comprises two panels of material 322 and 324. The shape of the air bag 300 is oval and sufficiently long so that it can extend from the A-pillar to the C-pillar of a vehicle and function as a side curtain air bag. While not illustrated, this type of air bag is initially folded and hidden within a housing or tearable trim strip located at or near the roof rail of a vehicle. As can be seen from FIG. 12, the pressure barrier 100a is similarly shaped to the pressure barrier 100 described earlier and is in essence formed by folding over a coated strip of material 102. A preferred construction of the panels 322 and 324, as well as the strip 102, is to use a coated woven fabric with the coated layers operatively touching each other. However, as also mentioned above, a woven, uncoated, low-permeability fabric can also be utilized. As can be seen in FIG. 12, the folded-over sides 108a and 108b of the strip 102 extend outwardly to the edges 23 and respectively of panels 322 and 324. The panels 322 and 324 and the folded-over panel or strip 102 are sewn together by a seam 110 that generally extends about the periphery of the panels 322 and 324. Provision for an inflator or fill tube would also be provided. Additionally, the coated layers of panels 322 and 324 are RF welded to the coated layer of the folded-over strip or panel 102. The coating material (such as urethane or vinyl) is chosen so that it is excitable by an RF source. Other material can be used which can be excited by different sources of energy such as heat.

Figure 13:
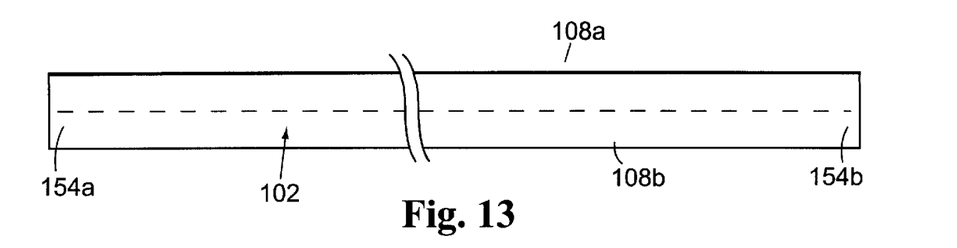
Figure 14:
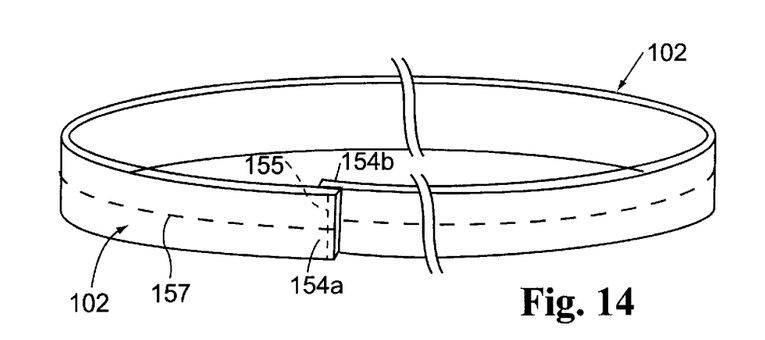
Figure 15:
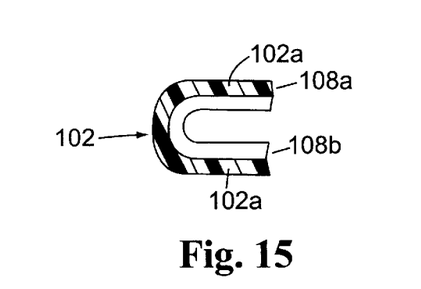

The following describes a method by which the air bag 300 can be assembled. With reference to FIG. 13, the ends 154a and 154b are overlaid as shown in FIG. 14 and sewn or bonded together, forming a flat ring. The panel 102 is thereafter folded over on its centerline 157 such that the ring is now U-shaped in cross section as shown in FIG. 15. With the strip 102 folded as described above forming a U-shaped (in cross-section) ring, the coated layer 102a of the strip 102 lies on the top and bottom of this folded-over, U-shaped configuration. The ring, once folded over, is positioned upon one of the panels, for example panel 324, which has been laid flat on a work surface. The sides 108a and 108b of the strip 102 are aligned to the edge of panel 324. Thereafter, panel 322 is placed upon the U-shaped ring, formed by panel 102, yielding the configuration shown in FIG. 12.

As the U-shaped ring of panel 102 is placed on the larger panel 324 and panel 322 is placed thereabove, a manual spring clamp, diagrammatically shown as 340, is periodically clipped to the periphery of the panels, thereby sandwiching the U-shaped ring of panel 102 between panels 322 and 324, thereby keeping the preferred orientation of the panels 322, 324 and 102. With the periphery of the panels secured by one or more clips 340, the various panels are thereafter sewn together by sewing a seam 110 generally parallel to the edge of panels 322 and 324. Either simultaneously with the sewing of seam 110 or thereafter, the air bag 300 is subjected to localized RF energy (when using coating material excitable by RF energy) transmitted from a sending unit 350 to a receiving unit, which is typically a ground plane, to thereby introduce into the panels two generally peripheral welded seams 352 and 354, which respectively weld the coated layers 322a and 102a together, as well as the coated layers 324a and 102a together. For the purpose of illustration, cross-hatching has been omitted from the layers of the fabric shown in FIGS. 12 and 13 so that the RF welds 352 and 354 can more easily be seen.

Figure 16:
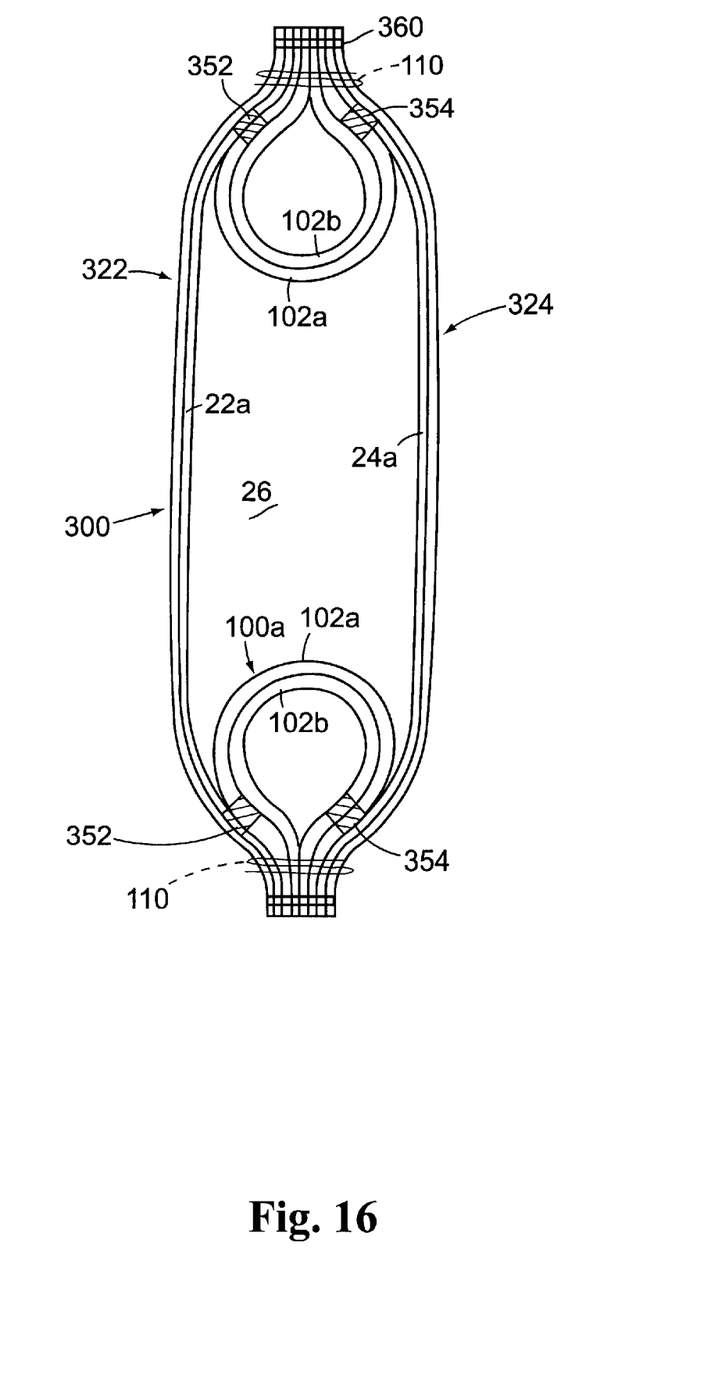

Reference is briefly made to FIG. 16, which is a cross-sectional view generally identical to FIG. 12 and more clearly shows the relationship of the barrier 100a to the panels 322 and 324. When the interior or internal chamber 26 of air bag 300 is inflated, the pressure barrier 100a will deform, be pushed into the seam 110 and generally resemble the configuration shown in FIG. 10.

Reference is made to FIG. 11 as well as FIG. 16. As can be seen, the bag includes a border 356 that is outside of the sewn seam 110. This border includes one or more openings 360, which serve as mounting holes to permit the air bag 300 to be secured to the roof rail of the vehicle. FIG. 11 diagrammatically illustrates an inflator 30 positioned external to the air bag 300 and a tube or conduit 31 is used to communicate inflation gas into the airbag 300.

Many changes and modifications in the above-described embodiment of the invention can, of course, be carried out without departing from the scope thereof. For example, the sewn seam can be replaced with an RF welded seam in certain applications. Accordingly, that scope is intended to be limited only by the scope of the appended claims.

What is claimed is:

1. A safety apparatus including an air bag (20), the air bag comprising:
    a first (22) and second (24) panel of flexible, relatively impermeable material, each panel having a respective peripheral edge (23,25), the first and second panel joined together along a structural first joint (110) which extends along a determinable length of the peripheral edges to define an inflatable chamber (26), wherein the first joint (110) is capable of withstanding a load resulting when forces tend to pull the first and second panel apart;
    inlet means for communicating inflation gas into the chamber;
    pressure barrier means (100), located within the chamber, upstream of the first joint (110), for at least reducing inflation gas flow to and through the first joint, the pressure barrier means comprising at least one strip (102) of flexible material characterized as having a low permeability to gas flow thereacross, the strip including a first side, a second side and a center portion between the first and second sides, the first side (102a) secured to the first panel along a second joint (112a) which is remote for the first joint, and the second side (102b) secured to the second panel along a third joint (112b) which is remote from the first and second joints, wherein when the first and second panels are subjected to a force tending to pull the first and second panels apart, the center portion of the pressure barrier remains slack between the first and the second panels, and when the chamber is sufficiently pressurized, the pressure urges the slack center portion toward the first joint.

2. The apparatus as defined in claim 1 wherein the distance from the second joint to the first joint plus the distance from the first joint to the third joint is shorter than the distance from the second joint to the third joint as measured along an unsecured portion of the strip.

3. The apparatus as defined in claim 2 wherein the first joint is formed by sewing overlaid peripheral edges of the first and second panels together.

4. The apparatus as defined in claim 3 wherein the second and third joints are formed by sewn seams joining sides of the strip to the first and second panels.

5. The apparatus as defined in claim 4 wherein each sewn seam of the second and third joints respectively includes a bobbin thread side located on an exterior face of the first and second panels.

6. The apparatus as defined in claim 5 wherein upon inflation of the air bag, the pressure internal to the chamber pushes the pressure barrier means into the first joint covering same and upon adjacent portions of the first and second panels and wherein portions of the strip respectively overlay each of the sewn seams forming the second and third joints.

7. The apparatus as defined in claim 1 wherein the first joint is formed by energy bonding.

8. The apparatus as defined in claim 1 wherein the second and third joints are formed by energy bonding.

9. The apparatus as defined in claim 1 wherein the center portion when viewed in cross-section extends between the second and the third joints in a generally curved configuration.

10. The apparatus as defined in claim 1 wherein the center portion when viewed in cross-section extends between the second and the third joints in a generally curved configuration and when the chamber is sufficiently pressurized, the pressure urges the slack center portion against the second and the third joints to cover the second and third joints.

11. A safety apparatus including an air bag (20), the air bag comprising:
    a first (22) and second (24) panel of flexible, relatively impermeable material, each panel having a respective peripheral edge (23,25), the first and second panel joined together along a structural first joint (110) which extends along a determinable length of the peripheral edges to define an inflatable chamber (26), wherein when the first and second panels are pulled apart force the first joint becomes stressed;
    inlet means for communicating inflation gas into the chamber;
    pressure barrier means (100), located within the chamber, upstream of the first joint (110) and not physically secured to the first joint, for at least reducing inflation gas from escaping through the first joint, the pressure barrier means joined to the first and second panels along respective second and third joints and wherein when the first and second panels are pulled apart and the first joint becomes stressed while the pressure barrier means remains in a slack condition spanning the first and the second panels.

12. A safety apparatus including an air bag (20), the air bag comprising;
    a first (22) and second (24) panel of flexible, relatively impermeable material, each panel having a respective peripheral edge (23,25), the first and second panel sewn together along a first joint (110) which extends along a determinable length of the peripheral edges to define an inflatable chamber (26), wherein inflation gas in the chamber may leak therefrom through the sewn first joint;
    inlet means for communicating inflation gas into the chamber;
    pressure barrier means (100), located within the chamber, upstream of the first joint (110) and not physically fastened to the first joint, for reducing inflation gas flow through the first joint, the pressure barrier means sewn along respective second and third joints or seams to the first and second panels, such that when the first and second panels are pulled apart a center of the pressure barrier means remains in a slack condition.

13. The apparatus as defined in claim 12 wherein each of the first and second panels comprises a layer of woven material having at least one side coated and wherein the coated sides of the first and second panels are positioned facing one another.

14. A The apparatus as defined in claim 13 wherein the material forming the pressure barrier means includes a coated side and wherein such coated side is positioned upon the coated sides of the first and second panels.

15. The apparatus as defined in claim 12 wherein the pressure barrier means is a thin flexible fabric joined only along its sides to one of the first and second panels.

* * * * *